(12) United States Patent
Tatsuta (10) Patent No.: US 6,592,045 B1
(45) Date of Patent: Jul. 15, 2003

(54) DATA RECORDING MEDIUM, DATA RECORDING METHOD AND COMPUTER-READABLE MEMORY MEDIUM

(75) Inventor: Seiji Tatsuta, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 164 days.

(21) Appl. No.: 09/655,348

(22) Filed: Sep. 5, 2000

(30) Foreign Application Priority Data

Sep. 6, 1999 (JP) .......................................... 11-251511

(51) Int. Cl.$^7$ .............................................. G06K 19/06
(52) U.S. Cl. ............. 235/494; 235/462.01; 235/462.03; 235/462.08; 235/375
(58) Field of Search ....................... 235/462.01, 462.03, 235/462.08, 375, 494

(56) References Cited

U.S. PATENT DOCUMENTS

| | | | | |
|---|---|---|---|---|
| 5,189,292 A | * | 2/1993 | Batterman et al. | ........... 235/456 |
| 5,304,787 A | * | 4/1994 | Wang | ................... 235/462.09 |
| 5,454,054 A | * | 9/1995 | Iizuka | ......................... 235/456 |
| 5,552,593 A | * | 9/1996 | Biss | ............................. 235/494 |
| 5,719,886 A | | 2/1998 | Matsui | ...................... 371/40.1 |
| 5,835,615 A | * | 11/1998 | Lubow et al. | ........... 101/401.2 |
| 5,866,895 A | | 2/1999 | Fukuda et al. | .............. 235/494 |
| 5,896,403 A | | 4/1999 | Nagasaki | ................... 371/37.1 |
| 5,898,709 A | | 4/1999 | Imade | ..................... 371/40.11 |

* cited by examiner

*Primary Examiner*—Michael G. Lee
*Assistant Examiner*—Steven S. Paik
(74) *Attorney, Agent, or Firm*—Frishauf, Holtz, Goodman & Chick, P.C.

(57) ABSTRACT

Data is recorded on a data recording medium as a code that can be optically read by using a manual scanning process. Images to be recorded on the periphery of the code include codes, images, texts, etc., and they respectively have attributes such as the shape, color and density. Then, depending on these attributes, the images are classified into those which cause adverse effects when read together with the code and those which do not cause any adverse effects, and the former images are referred to as interference images, and the latter images are referred to as non-interference image. Here, upon recording the above-mentioned code, on the periphery of the code is placed a non-interference area from which any of interference images having attributes (shape, color, density) that cause adverse effects upon reading the code are not allowed to exist. Any image other than the interference images, that is, any non-interference image, can be recorded within the non-interference area.

18 Claims, 8 Drawing Sheets

DATA RECORDING MEDIUM, DATA RECORDING METHOD AND COMPUTER-READABLE MEMORY MEDIUM

CROSS-REFERENCE TO RELATED APPLICATIONS

This application is based upon and claims the benefit of priority from the prior Japanese Patent Application No. 11-251511, filed Sep. 6, 1999, the entire contents of which are incorporated herein by reference.

BACKGROUND OF THE INVENTION

The present invention relates to a data recording medium and a data recording method of such a medium, which is a data recording medium on which data is recorded as a code that can be optically read by using a manual scanning process, and which is provided with an non-interference area in which only a non-interference image having an attribute causing no adverse effects on the code reading process is allowed to exist, so that, even when a reading device is not accurately positioned on the code due to the manual scanning process, it is possible to prevent the code reading process from being interrupted by interference from images located on the periphery of a target code to be read, and consequently to use the recording face effectively by reducing limitations imposed on the layout process. Moreover, the present invention also relates to a computer-readable memory medium which stores a program for allowing the computer to execute such a data recording method.

Figure 1:
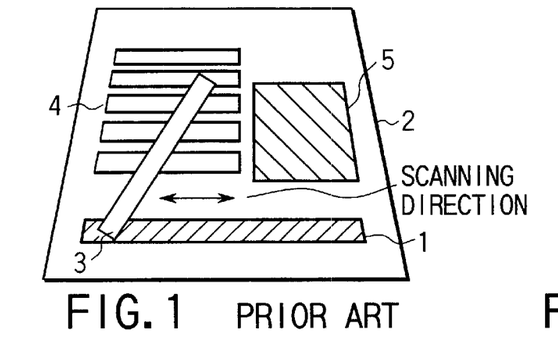
FIG. 1 is a drawing that shows a recording medium in which data is recorded as codes that can be optically read.

In the case when, from a recording medium 2 on which data is recorded as an optically-readable code 1 as illustrated in FIG. 1, the code is read by scanning it manually by using a reading device 3, it is necessary to solve problems resulting from the manual operation, such as instability in the scanning rate and inaccuracy in the reading position. For this reason, U.S. Pat. No. 5,866,895 has proposed a system in which digital data is divided into blocks, each block unit having a predetermined amount of information, and these are recorded on a recording medium, and reproduced. In the system disclosed by this U.S. Patent, each of the divided block data is read together with the corresponding address so that information is reproduced by combining the block data based upon the address. Since this system divides data on a block basis, and then records/reproduces the data, it is superior in that even in the manual scanning operation which has the problems of irregular scanning rates and inaccurate reading positions, it allows the data to be positively read.

Although this system, which divides data on a block basis, and then records/reproduces the data, provides great effects, consideration needs to be given to the following problems. In the event of a greatly winding scanning process due to the manual operation, since the entire blocks are not picked up correctly, a data loss might occur, or since images (hereinafter, referred to collectively as the peripheral image) such as a text (characters, symbols, etc.) 4 and a picture image (photographs, illustrations, etc.) 5, located on the periphery of the code, tend to be picked up together with the effective blocks, and these problems tend to cause serious adverse effects on the code reading operation.

Figure 2:
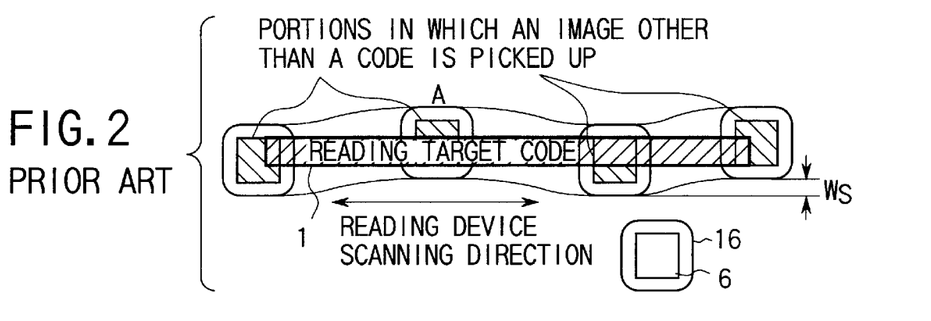
FIG. 2 is an explanatory drawing that shows winding that is permissible in a code reading process.

For example, in the case of a reading operation on the code 1 recorded as shown in FIG. 2, the winding is only permitted up to $W_S$, and any winding exceeding this limit causes the code 1 to deviate from a pickup area 6, resulting in a data loss.

Figure 3:
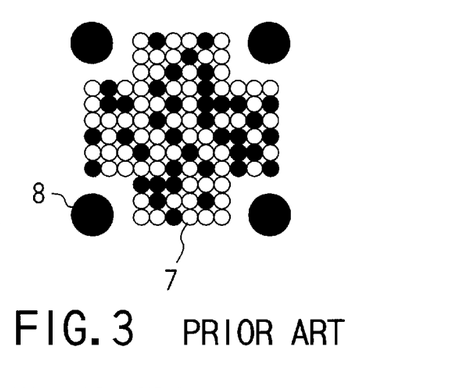
FIG. 3 is a drawing that shows a physical construction of blocks forming a code.
Figure 4:
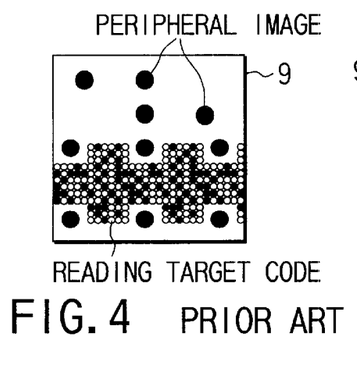
FIG. 4 and FIG. 5 are drawings each of which shows a pickup screen in which there is a peripheral image that gives adverse effects on the reading process of a reading target code.
Figure 5:
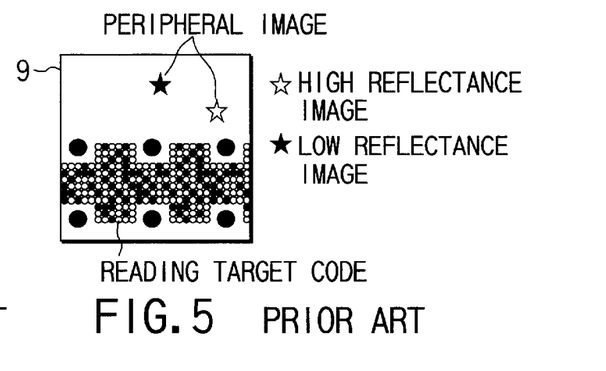

Moreover, in the case when, as shown in FIG. 3, a block is constituted by data dots 7 corresponding to data to be recorded and a marker 8 that is an index of the block and that is also used for positioning the data dots 7 to be read, if there is a peripheral image similar to the marker at the pickup position A in FIG. 2, the resulting pickup screen 9 is like one as shown in FIG. 4; therefore, this peripheral image might be erroneously detected as the marker 8, resulting in a problem in the marker detecting process. Moreover, if there is a peripheral image having a reflectance higher than the highly reflective element of the code 1 or lower than the low reflective element of the code 1, the resulting pickup screen 9 is like one as shown in FIG. 5; therefore, the peak of luminance within the pickup screen, which forms a reference in the threshold process carried out upon judging the presence or absence of a dot, might be picked up from this peripheral image, resulting in a problem in the threshold detecting process.

Figure 6:
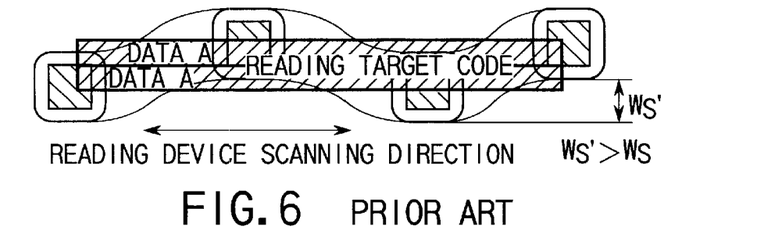
FIG. 6 is an explanatory drawing that shows duplicated data to be recorded on the code, which is used to solve the problem with the winding permissible limit.

Here, in order to solve the problem with the winding permissible limit, as illustrated in FIG. 6, a recording medium has been proposed in which data A to be recorded in a code 1 is duplicated so that a greater winding $W_S'$ permissible limit is provided.

Moreover, in order to solve the problem with the peripheral image, one solution is to place the code 1 with a sufficient gap from the peripheral image. This arrangement makes it possible to prevent the block containing effective data from being picked up with the peripheral image, and consequently to prevent an inaccurate data reading process due to influences from the image.

However, this arrangement in which the code 1 is simply placed with a sufficient gap from the peripheral image so as to prevent the peripheral image from being picked up together with the code fails to effectively use the recording face. For example, recording only one code requires a large space on the periphery thereof, resulting in a reduction in the recording density and a limitation imposed on the layout of the recording face.

BRIEF SUMMARY OF THE INVENTION

The present invention has been made so as to solve the above-mentioned problems, and it is an object to provide a data recording medium, as well as a data recording method, which allows a code to be read without being interrupted by interference from the peripheral image even when a reading device is not appropriately positioned on the code, and which also makes it possible to effectively use the recording face by reducing limitations imposed on the layout. Another object of the present invention is to provide a computer-readable memory medium which stores a program for allowing the computer to execute such a recording method.

According to a first aspect of the present invention, there is provided a data recording medium, comprising:
  an area in which data is recorded as a code that can be optically read by a manual scanning process; and
  a non-interference area placed on the periphery of the code, the non-interference area being an area from which any interference image having an attribute causing adverse effects in reading the code is not allowed to exist.

According to a second aspect of the present invention, there is provided a data recording method, which records data as a code that can be optically read by using a manual scanning process, comprising the steps of:
  placing a non-interference area on the periphery of the code on the recording medium, the non-interference area being set so that any interference image having an attribute causing adverse effects on the code reading process is not allowed to exist therein; and
  recording the code having the non-interference area.

According to a third aspect of the present invention, there is provided a computer-readable memory medium comprising a program containing instructions which, upon recording data as a code that can be optically read by using a manual scanning process, executes the steps of:

placing a non-interference area on the periphery of the code on the recording medium, the non-interference area being set so that any interference image having an attribute causing adverse effects on the code reading process is not allowed to exist therein; and outputting the code including the non-interference area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring to Figures, the following description will discuss embodiments of the present invention.

First Embodiment

First, referring to FIGS. 7 through 11, the following description will discuss a first embodiment of the present invention.

Figure 7:
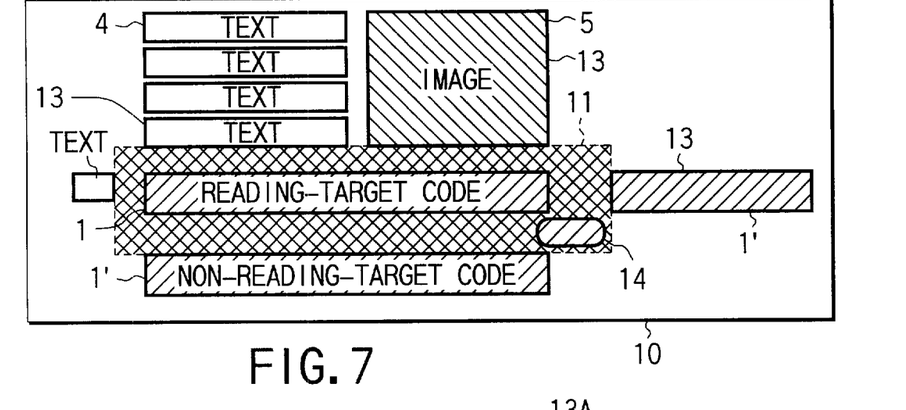
FIG. 7 is a drawing that shows the construction of a data recording medium in accordance with a first embodiment of the present invention.

As illustrated in FIG. 7, in a recording medium 10 in which data is recorded as codes 1 which can be optically read by a manual scanning process, a non-interference area 11 is placed on the periphery of a reading target code 1. Here, in FIG. 7, only the non-interference area 11 of the reading target code 1 is indicated by a hatched portion. In this case, the reading target code 1 and a non-reading-target code 1' are changed depending on what code the operator tries to read, and any code is provided with a non-interference area.

Next, the following description will discuss the functions and effects of the present embodiment.

Figure 8:
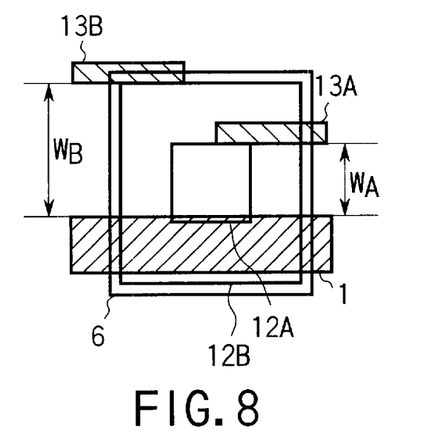
FIG. 8 is an explanatory drawing that shows a feature extraction area.

A reading device 3 is manually operated by the operator so as to scan the reading target codes 1, and effective data is read from the codes 1 thus picked up so that the original data is reproduced. Here, in the case when the codes 1 are read in a winding manner due to the manual scanning process, as illustrated in FIG. 8, peripheral images might be picked up in some cases.

Figure 9:
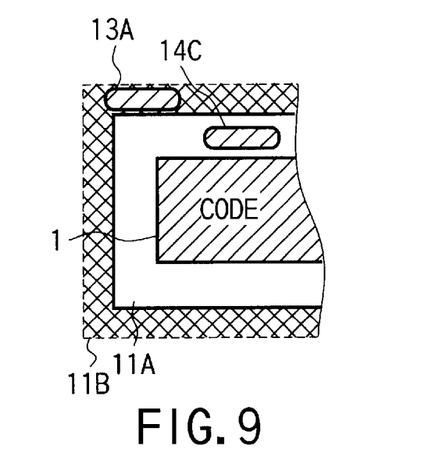
FIG. 9 is an explanatory drawing that shows a non-interference area in accordance with each feature extraction area.

Normally, prior to the reading process of the code 1, the reading device 3 extracts some of the features of the code 1 from a pick-up image area. Here, an explanation will be given by exemplifying a case in which features to be extracted are represented by features "A" and "B". As illustrated in FIG. 8, supposing that areas from which the respective features "A" and "B" are detected are represented by feature-extraction areas "A" 12A and "B" 12B, an interference image "A" 13A which interferes with the extraction of the feature "A" needs to be placed with a gap of not less than $W^A$ so as not to be located within the feature extraction area "A" 12A. In the same manner, an interference image "B" 13B which interferes with the extraction of the feature "B" needs to be placed with a gap of not less than $W_B$ so as not to be located within the feature extraction area "B" 12B. In this manner, the area in which the interference image "A" 13A is not allowed to exist is referred to as a non-interference area "A" 11A, and the area in which the interference image "B" 13B is not allowed to exist is referred to as a non-interference area "B" 11B, and as illustrated in FIG. 9, each of these is placed on the periphery of the code 1. In other words, in the case when the reading device 3 is provided with a plurality of interference modes in association with features to be extracted, a non-interference area is set for each interference mode.

Here, a non-interference image 14, which does not interfere with these feature extractions, is freely placed even in these non-interference areas 11. In other words, as illustrated in FIG. 9, in response to the attribute of a peripheral image, for example, a non-interference image "C" 14C may be placed in the non-interference area "A" 11A, and an interference image "A" 13A may be placed in the non-interference area "B" 11B (out of the non-interference area "A" 11A, in this case).

Here, in the case of a reading device 3 which irradiates a code 1 consisting of markers 8 and data dots 7 that are recorded as a black mark on the white background with red light so as to extract continuous black marks corresponding to the marker 8 as the feature "A" and also extracts a peak value of luminance within an image pickup area as the feature "B" so as to carry out an optimal binarizing process, a red peripheral image forms the non-interference image "C" 14C since it is picked up in the same manner as the background, and can be freely placed even in the vicinity of the code; in contrast, a dot like the marker forms the interference image "A" 13A, and has to be placed outside the non-interference area "A" 11A. Moreover, an image having a reflection factor lower than the black portion of the code 1 and an image having a reflection factor higher than the white portion of the code 1 form interference images "B" 13B, and placed out of the non-interference area "B" 11B.

With this arrangement, even when the reading device 3 is not appropriately positioned with respect to the code 1 due to the manual scanning process, the reading process of the code 1 is not intervened by interference from the peripheral image; thus, it is possible to positively reproduce the data. Moreover, in the case of any non-interference image 14, it can be freely placed in the vicinity of the code so that the recording face can be effectively utilized by incorporating a peripheral image having a non-interference attribute thereto. Furthermore, depending on attributes of interference images, such as a shape, color and density of code 1, text 4, an image 5, etc., minimum non-interference areas 11 required are set so that the recording face can be utilized more effectively.

Figure 10:
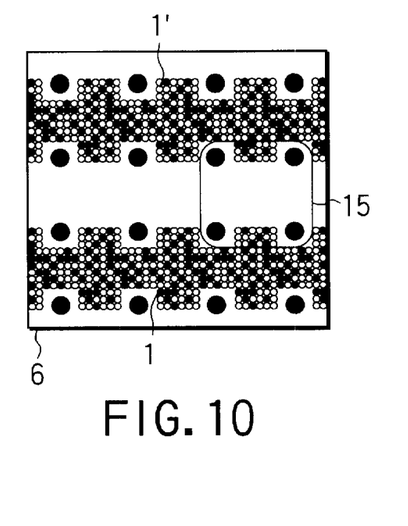
FIG. 10 is an explanatory drawing that shows paired markers erroneously formed due to a non-reading-target code.
Figure 11:
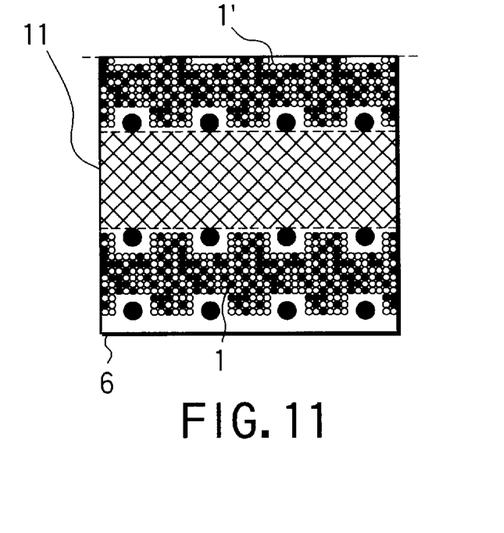
FIG. 11 is an explanatory drawing that shows a non-interference area formed so as to prevent the erroneous formation of the paired markers resulting from the non-reading-target code.

Moreover, in the case when the interference image 13 is a code, the corresponding interference area 11 is set wider than that of an interference image 13 other than a code. For example, in the case of a code 1 having a block structure shown in FIG. 3, upon reading the block, four markers 8 forming pairs are first detected. In this case, as shown in FIG. 10, when a non-reading-target code 1' is located in the vicinity thereof, erroneous marker pairs 15 might be formed between the codes, or any block of the non-reading-target code 1' might be read, resulting in a failure in appropriately reproducing data. Therefore, as illustrated in FIG. 11, the non-interference area 11 is set wider so that only the blocks of the reading target code 1 can be positively read.

Moreover, even in the case when a reading target code has not been read, if any block of the non-reading-target code 1' is read during a scanning process, the block might be processed as effective data; therefore, in order to prevent the non-reading-target code 1' from being erroneously read in all the read scanning process, it is preferable to set wider the non-interference area 11 in particular along the scanning direction side. This arrangement makes it possible to prevent the reading non-target code 1' other than the reading target code 1 from being erroneously read and also to prevent the resulting improper data reproducing process.

As described above, in the present embodiment, even when the reading device 3 is not accurately positioned with respect to a code 1 due to the manual scanning process, the reading process of the code 1 is not intervened by interference from the peripheral image; thus, it is possible to positively reproduce the data.

Second Embodiment

The following description will discuss a second embodiment of the present invention.

Figure 12:
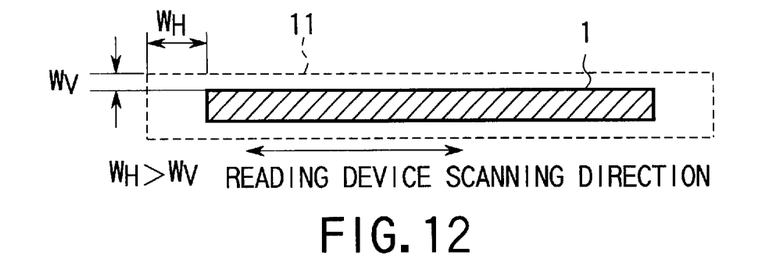
FIG. 12 is a drawing that shows a non-interference area in a data recording medium in accordance with a second embodiment of the present invention.

In the second embodiment, as illustrated in FIG. 12, a non-interference area 11 is set to be wider on the scanning direction side of the code 1 than that on the side orthogonal thereto.

Next, the following description will discuss the functions and effects of the present embodiment.

Figure 13:
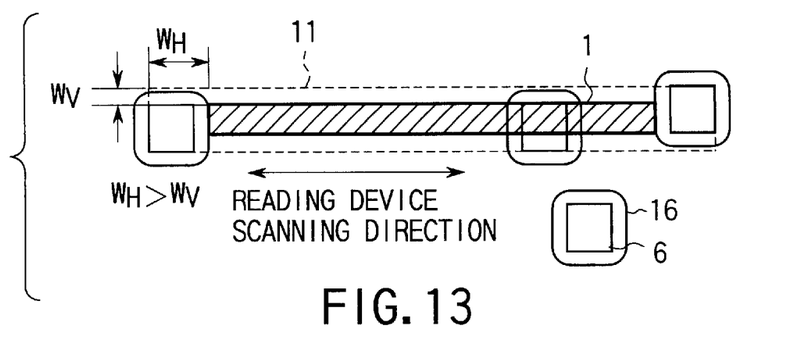
FIG. 13 is an explanatory drawing that shows the size of the non-interference area of FIG. 12.

The reading device 3 is manually allowed to scan on a reading target code 1 so that effective data is read from the code thus picked up and the original data is reproduced. Here, in the case of the manual scanning process, as illustrated in FIG. 13, in order to positively scan the entire code, the scanning tends to be started immediately before the external case 16 of the reading device 3 reaches the code 1, and tends to be finished immediately after it has passed through the code 1. In other words, the scanning device 3 tends to overrun on the scanning direction sides, with the result that the peripheral image is easily picked up on the code ends. Therefore, on the code ends in the scanning direction, the non-interference area 11 is preliminarily set wider so as to be placed with a gap not less than $W_H$ from the interference image 13, in association with the external case 16 of the reading device 3 that reads the code.

In this manner, in the present embodiment, even when the reading device 3 overruns on the code at the time of scanning start and/or end due to the manual scanning process, the reading process of the code 1 is not intervened by interference from the peripheral image; thus, it is possible to positively reproduce the data.

Third Embodiment

The following description will discuss a third embodiment of the present invention.

Figure 14:
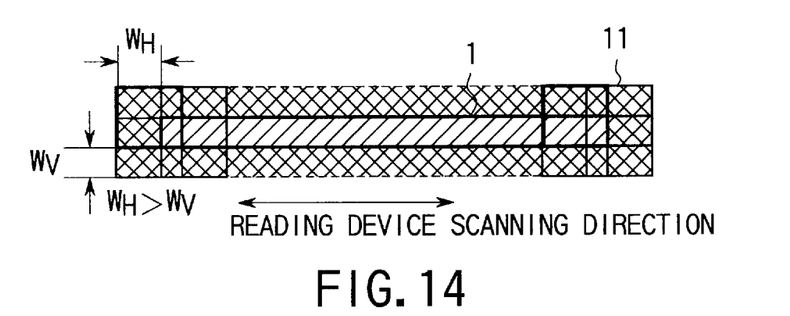
FIG. 14 is a drawing that shows a non-interference area in a data recording medium in accordance with a third embodiment of the present invention.

In the third embodiment, as illustrated in FIG. 14, a non-interference area 11, which is determined in accordance with the positioning performance of a reading device 3 and the specifications of a code 1, is placed on the periphery of the code 1. Here, the specifications of the code 1 refer to overall characteristics concerning the scanning performances of the code 1, such as the size, structure and the presence or absence of overlapping.

Next, the following description will discuss the functions and effects of the present embodiment.

The reading device 3 is manually allowed to scan on a reading target code 1 so that effective data is read from the code thus picked up and the original data is reproduced. Here, in the case of the manual scanning process, its positioning performance varies depending on factors such as the external shape of the reading device 3 (the positional relationship between the external case 16 and the pickup area 6, ease in positioning, ease in gripping, etc.) and/or its size and the size of the pickup area 6. Here, if the positioning performance is inferior, the amount of winding becomes greater and the reading device 3 is more likely to overrun, with the result that the code tends to deviate from the pickup area 6 and the peripheral image tends to be easily picked up. Here, the code 1 is made free from the winding through its modification in the specifications; that is, for example, as illustrated in FIG. 6, its winding resistant property can be improved by recording data in an overlapped manner.

Figure 15:
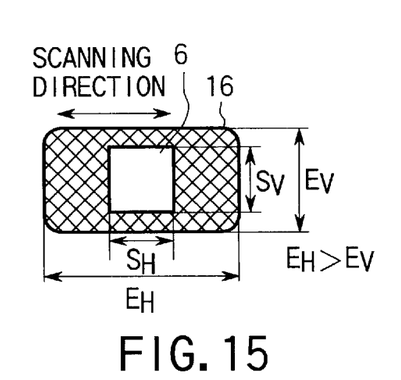
FIG. 15 is a drawing that shows the relationship between the size of the external case of a reading device and the size of pickup area.
Figure 16:
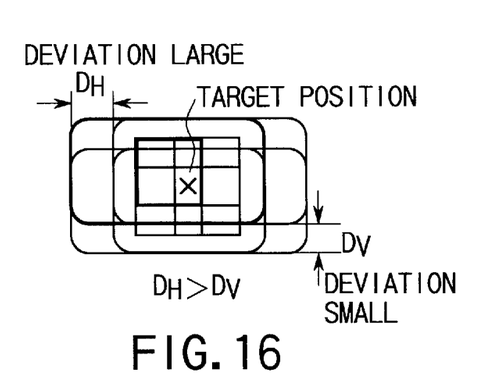
FIG. 16 is an explanatory drawing that shows a deviation occurring upon positioning the reading device on the code.

Here, for example, it is assumed that a reading device 3 having an external appearance as shown in FIG. 15 when viewed from the code contact face is provided. In this case, since the distance from the external case 16 to the pickup area 6 is long in the scanning direction, with the result that the positioning in the scanning direction becomes difficult in the scanning direction and, as illustrated in FIG. 16, great deviations tend to occur in the scanning direction and the code 1 tends to deviate from the pickup area 6. Therefore, in this case, the peripheral image tends to be picked up on the code ends. In order to solve this problem, the non-interference area 11 is determined in accordance with the amount of deviation $D_H$ in the scanning direction and the amount of deviation $D_V$ ($D_H > D_V$) in the direction orthogonal to the scanning direction. For example, assuming that the specification of the reading target code 1 permits winding corresponding to the amount of deviation $D_V$ without the need for duplicated recording, as shown in FIG. 14, the widths of the non-interference area $W_H$ and $W_V$ are set to be $W_H = D_H$ and $W_V = D_V$.

In this manner, in the third embodiment, in the manual scanning process, the positioning performances dependent on the external shape are reflected to the setting of the non-interference area 11, and if there is any directivity in the positioning performance, a wider non-interference area 11 is provided on the side having the lower positioning performance so that it is possible to ensure a minimum non-interference area 11 required for the positioning performance, and consequently to reproduce data positively, while utilizing the recording face effectively, without interruption with the reading process of the code 1 caused by interference from the peripheral image.

Fourth Embodiment

The following description will discuss a fourth embodiment of the present invention.

Figure 17:
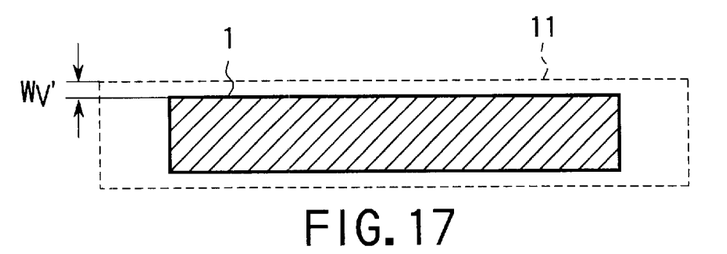
FIG. 17 is a drawing that shows a non-interference area in a data recording medium in accordance with a fourth embodiment of the present invention.

In the fourth embodiment, as illustrated in FIG. 17, a non-interference area 11, which is determined in accordance with the positioning performance of a reading device 3 and the width of the code 1 in the direction orthogonal to the scanning direction (hereinafter, referred to as the width), is provided.

Next, the following description will discuss the functions and effects of the present embodiment.

As described earlier, the amount of positional deviation of the code 1 with respect to the pickup area 6 varies depending on the positioning performances of the reading device 3, and the permissible amount can be varied depending on the specifications of the code 1. In other words, the degree in which the peripheral image is picked up is varied depending on the positional performances of the reading device 3 and the specification of the code 1; therefore, based upon these factors, the non-interference area 11 is determined.

Figure 18:
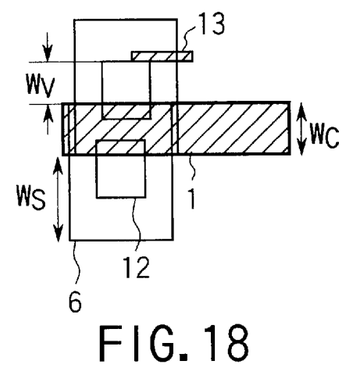
FIG. 18 is an explanatory drawing that shows the relationship between the width of winding and a non-interference area.
Figure 19:
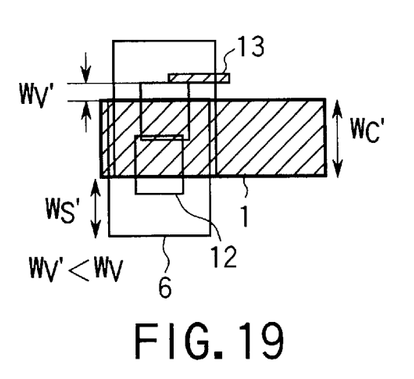
FIG. 19 is an explanatory drawing that shows the relationship between the width of winding and a non-interference area in the case when the width of the code is widened.

For example, assuming that the specification of the reading target code 1 is set to have a width $W_C$ without overlapped recording portions, and that the winding width $W_S$ of the recording device 3 is a permissible winding limit that is determined by the code, the winding width $W_S$ is given by subtracting the code width $W_C$ from the width of the code pickup area, as shown in FIG. 18. In this case, since the interference image 13 has to be located outside the feature extraction area 12, it is placed with a gap not less than $W_V$ from the code 1. Here, as illustrated in FIG. 19, in the case when the recording is made with the width of the code 1 being widened to $W_C'$, even when the interference image 13 is placed outside the feature extraction area 12 in the same manner, it is only necessary to place the interference image 13 with a gap not less than $W_V'$ from the code 1, although the winding width $W_S'$ is narrowed; thus, it becomes possible to narrow the non-interference area 11. In other words, the non-interference area 11 can be set based upon the width of the code 1, and the recording face can be utilized more effectively.

Figure 20:
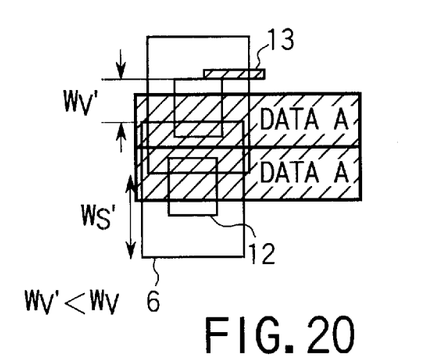
FIG. 20 is an explanatory drawing that shows the relationship between the width of winding and a non-interference area in the case of a duplicated code in which data is duplicated and recorded.
Figure 21:
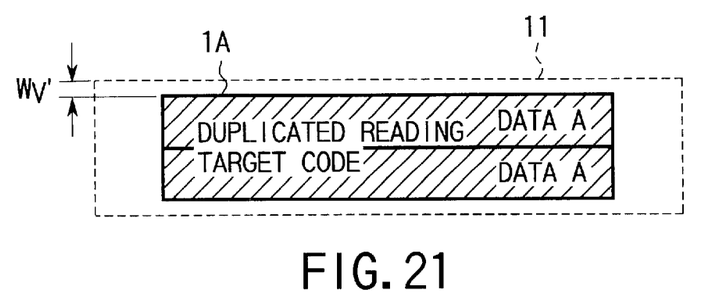
FIG. 21 is a drawing that shows a non-interference area in the case of the duplicated code.

Moreover, in the case when the code 1A is recorded with data overlapped as illustrated in FIGS. 20 and 21, while the winding width $W_S$ of the recording device 3 of FIG. 18 is fixed, even when the interference image 13 is placed outside the feature extraction area 12 in the same manner, it is only necessary to place the interference image 13 with a gap not less than $W_V'$ from the overlapped code 1A; thus, it becomes possible to narrow the non-interference area 11. In other words, in the case when the code 1 has a specification for recording data in an overlapped manner, the non-interference area 11 can be set narrower depending on the number of overlaps on the side having overlapped data; thus, the recording face can be utilized more effectively.

In this manner, in the fourth embodiment, a minimum non-interference area 11 required can be set depending on the positioning performance and the width of the code 1; thus, it is possible to reproduce data positively, while utilizing the recording face effectively, without interruption from interference from the peripheral image.

Fifth Embodiment

Referring to FIGS. 22 through 27, the following description will discuss a fifth embodiment of the present invention.

Figure 22:
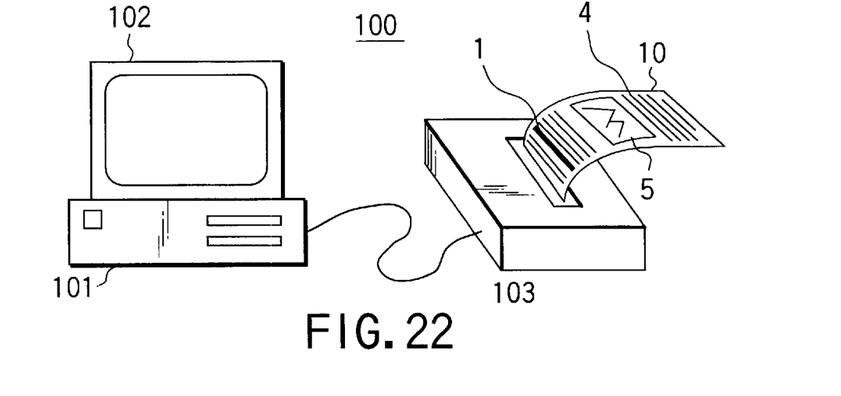
FIG. 22 is a drawing that shows the construction of a data recording device in accordance with a fifth embodiment of the present invention.

In the present embodiment, as illustrated in FIG. 22, a data recording device 100 is constituted by a personal computer (PC) 101, a monitor 102 and a printer 103, and paper is used as a recording medium 10. Moreover, as illustrated in FIG. 7, the data recording device 100 records data on the recording medium 10 as a code 1 that can be optically read through a manual scanning process, together with a text 4, an image 5, etc.

Next, the following description will discuss the functions and effects of the present embodiment.

In the PC 101, a text 4, an image 5, a code 1, etc. are taken as objects, and these objects are laid out in their recorded areas on the monitor 102 so as to be recorded on the same paper, and outputted to the printer 103. Here, the objects may be taken through an input apparatus of the PC 101 or through a network, or these may be produced on the PC 101.

Referring to the flow chart of FIG. 23, an explanation will be given of the layout method of the objects in detail.

First, in the PC 101, objects are taken (step S1). Next, based upon attributes, such as the shape, color and density, of the objects thus taken, an object-judging process is carried out (step S2). In this object-judging process, a judgment is made as to whether the object is a code 1, or an interference image 13, and if there are a plurality of interference modes, a judgment is made as to the corresponding mode. If the object is not a code, then the result of the judgment is added thereto as a label (step S3). In other words, a label N is added to the non-interference image 14, and in the case of the interference images 13, labels of A, B and so on are added thereto depending on their interference modes.

Moreover, in the case when the object is a code 1, a non-interference area 11 is set on the periphery thereof so that the peripheral image will not give adverse effects on the reading process of the code 1 (step S4). Here, as explained in the aforementioned first embodiment, if there are a plurality of interference modes, the non-interference area 11 is set for each of the interference modes so that even when the reading device 3 is not accurately positioned on the code due to the manual scanning process, the peripheral image does not intervene with the reading process of the code 1.

Figure 24:
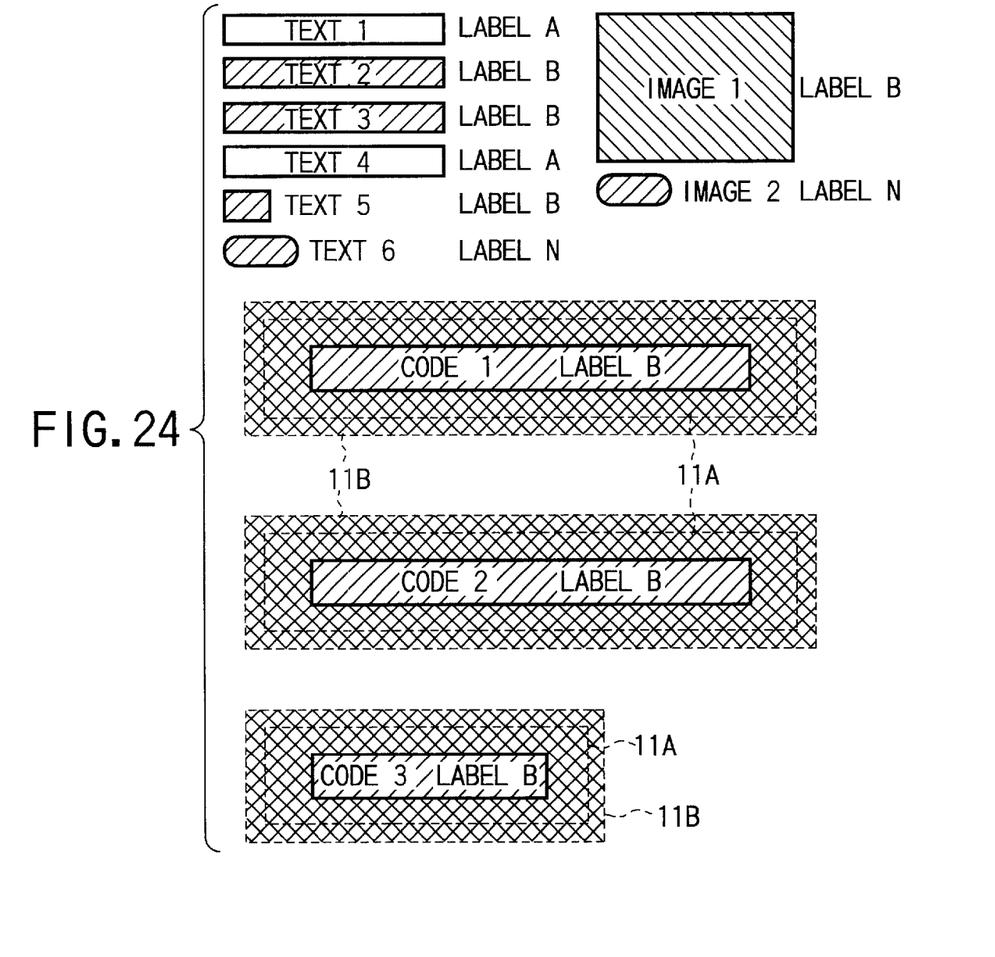
FIG. 24 is a drawing that shows a state of an object to which a label is added.

FIG. 24 shows an example showing the state of objects in this case. In the Figure, the labels to be applied to the objects can be internally stored in the PC 101, and it is not necessary to display them so as to allow the user to visually confirm them; however, it is more convenient to arrange them so as to pop up when the mouse cursor is placed thereon since this makes them serve as reference at the time of the layout.

The user makes selection of the objects thus labeled by using the mouse (step S5), and can move them freely on the layout window of the monitor 102 by dragging them (step S6). In this case, a judgment is made as to whether or not the label of the object and the corresponding non-interference area 11 are overlapped with each other at the transfer end (step S7), and if they are overlapped, a warning is displayed so as not to allow the object to be positioned there (step S8). Therefore, the user has to move the object to another place that is free from the warning (step S9).

Figure 25:
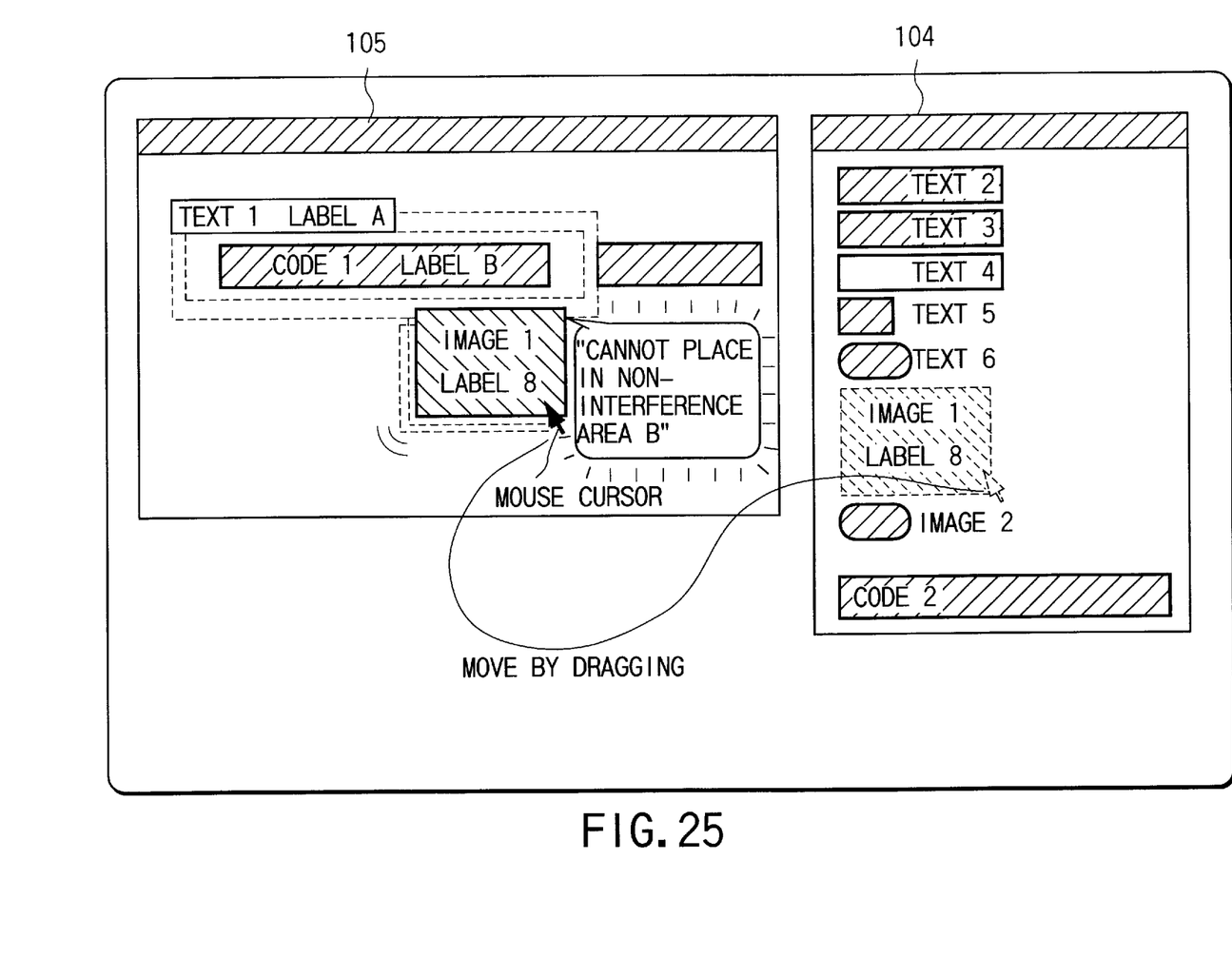
FIG. 25 is a drawing that shows a state of a layout job.

FIG. 25 shows the state of the layout job at this time. In FIG. 25, an image "1" was selected from objects displayed in the object window 104, and has been dragged to a lower right position with respect to the code 1 that has been placed in the layout window. Here, the image "1" has a label B added thereto, and since one portion thereof is overlapped with the non-interference area "B" 11B, with the result that a warning saying "can not place in non-interference area "B"" is displayed with a broken line indicating the non-interference area 11 of the code. In the state where this warning is displayed, the object cannot be dropped there, and has to be shifted to another place that is free from the warning, and then dropped. Moreover, in the case when the object dragged is a code 1, a judgment is made as to whether or not any interference object that has been already laid out is overlapped with the non-interference area 11 set on the periphery thereof. In the case when overlapped, a warning is displayed with a broken line indicating the non-interference area 11 of the code 1. In this case, it is more preferable to allow the user to make selection as to whether the object that is causing an interference is made active, and shifted to another place that is free from the warning, or the interference object is shifted.

In this manner, necessary objects are laid out on the layout window 105 of the monitor 102, and upon completion of the layout, this is outputted to a recording device (print output) or to a memory device (file storage) (step S10). Here, in the case when a new object is added during a layout editing process, the added object is subjected to the processes from the above-mentioned step S1.

Figures 26, 27:
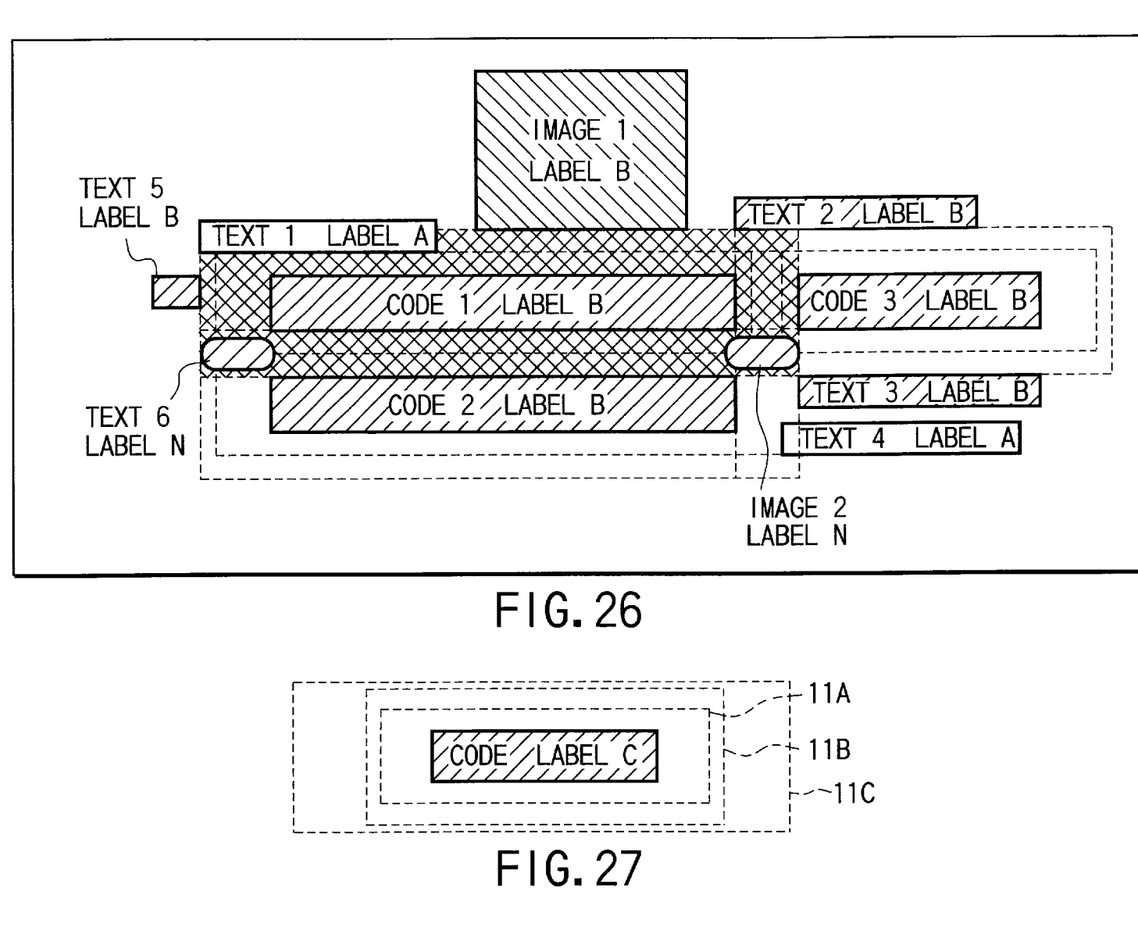
FIG. 26 is a drawing that shows an example in which objects are laid out.
FIG. 27 is a drawing that shows non-interference areas corresponding to non-reading-target codes.

FIG. 26 shows an example in which the objects in FIG. 24 are laid out in accordance with the present layout method. As illustrated in this Figure, no object to which a label A is added exists in the non-interference area "A" 11A, and no object to which a label B is added exists in the non-interference area "B" 11B. Here, in the Figure, the broken lines indicating the labels showing the interference modes and the non-interference areas 11 are given for convenience of explanation; and only the objects are arranged in an actual layout.

With this arrangement, even when the reading device 3 is not accurately positioned on a code due to the manual scanning process, it is possible to prevent the reading process of the code from being intervened by interference from the peripheral image, and consequently to reproduce data positively. Moreover, in the case of a non-interference image 14, it is freely placed in the vicinity of the code; therefore, any peripheral image having a non-interference attribute can be incorporated so that the recording face can be effectively utilized. Furthermore, it is possible to ensure a minimum non-interference area 11 required depending on attributes of the interference image 13 such as the shape, color and density of the code 1, image 5, text 4, etc., and consequently to utilize the recording face more effectively.

Moreover, in the above-mentioned steps S3 and S4, an interference due to the non-reading-target code 1' is discriminated from the other interference modes due to other images so as to label it as an interference mode C, and a label C is added to this code, while the corresponding non-interference area 11 is set as a non-interference area "C" 11C, as shown in FIG. 27. In FIG. 27, as explained in the first embodiment, the non-interference area "C" is set wider, in particular, on the respective sides of the code in the scanning direction as compared with the non-interference areas "A" and "B" so as not to erroneously read the non-reading-target code 1' over the entire read scanning process. With this arrangement, it is possible to prevent the non-reading-target code 1' from being read together with the reading target code 1', and consequently to prevent data from being erroneously reproduced.

In this manner, in the fifth embodiment, even when the reading device 3 is not accurately positioned on a code due to the manual scanning process, it is possible to prevent the reading process of the code 1 from being intervened by interference from the peripheral image, and consequently to record data in a manner so as to be produced positively.

Moreover, in the step S4, as described in the second embodiment, the non-interference area 11 may be set wider on the sides of the code 1 in the scanning direction as compared with the sides orthogonal thereto, and this arrangement may be used in this process. Thus, even when the reading device 3 overruns on the code at the time of scanning start and/or end due to the manual scanning process, the reading process of the code 1 is not intervened by interference from the peripheral image; thus, it is possible to record data in a manner so as to be reproduced positively.

Furthermore, in the step S4, as described in the third embodiment, the non-interference area 11 may be set in accordance with the positioning performance of the reading device 3 and the specification of the code 1, and this arrangement may be used in this process. Thus, in the manual scanning process, the positioning performances dependent on the external shape are reflected to the setting of the non-interference area 11, and if there is any directivity in the positioning performance, a wider non-interference area 11 is provided on the side having the lower positioning performance so that it is possible to ensure a minimum non-interference area 11 required for the positioning performance, and consequently to reproduce data positively, while utilizing the recording face effectively, without interruption with the reading process of the code 1 caused by interference from the peripheral image.

Moreover, in the step S4, as described in the fourth embodiment, the non-interference area 11 may be set in accordance with the positioning performance of the recording device 3 and the width of the code in the direction orthogonal to the scanning direction, and this arrangement may be used in this process. Consequently, a minimum non-interference area 11 required can be set depending on the positioning performance and the width of the code 1; thus, it is possible to record data in a manner so as to be reproduced positively, while utilizing the recording face effectively, without interruption from interference from the peripheral image.

Moreover, in the present invention, a memory medium in which a software program for realizing the functions of the above-mentioned embodiments is supplied to a system or a device, and a computer (or a CPU or an MPU) of the system or the device reads out the program stored in a memory medium and executes it; thus, the above-mentioned functions can of course be achieved.

In this case, the program itself, read out from the memory medium, realizes the functions of the above-mentioned embodiments; thus, the memory medium storing the program constitutes the present invention. With respect to the memory medium for supplying the program, for example, devices, such as a floppy disk (FD), a hard disk (HD), an optical disk, a magneto-optical disk (MO), a CD-ROM, a CD-R, a magnetic tape, a non-volatile memory card and a ROM, can be adopted.

Moreover, not only an arrangement in which the program, read out by a computer is executed so as to realize the functions of the embodiments, but also another arrangement in which based upon instructions given by the program, an OS (operation system), etc. operating on the computer executes one portion or the entire portions of the actual processes so as to achieve the functions of the embodiments, is included in the present invention.

Furthermore, an arrangement in which, after the program, read out from the memory medium, has been written in a function extension card inserted into the computer or a memory provided in a function extension unit connected to the computer, a CPU, etc., installed in the function extension card or the function extension unit, executes one portion or the entire portions of the actual processes based upon the instructions from the program, so as to achieve the functions of the embodiments, is also included in the present invention.

Referring to the above-mentioned embodiments, explanations have been given of the present invention; however, the present invention is not intended to be limited by the embodiments, and various modifications and applications can be made within the gist of the present invention. Here, the gist of the present invention is summarized as follows:

(1) A data recording medium, comprising:
an area in which data is recorded as a code that can be optically read by a manual scanning process; and
a non-interference area placed on the periphery of the code, the non-interference area being an area from which any interference image having an attribute causing adverse effects in reading the code is not allowed to exist.

This invention corresponds to the first embodiment, and its structure is shown in FIG. 7.

Here, with respect to the peripheral image, a code, an image, a text, etc. can be listed, and they respectively have attributes such as the shape, color and density. Then, depending on these attributes, peripheral images are classified into those which raise problems when read together with the reading target code 1 and those which raise no problems; and the former image is referred to as an interference image 13 and the latter image is referred to as a non-interference image 14.

In other words, in FIG. 7, any interference image 13 is not allowed to exist in the non-interference area 11 so that, even when the reading device 3 is not accurately positioned on a code due to the manual scanning process, the peripheral image will not give adverse effects in reading the code.

Therefore, with the above-mentioned arrangement (1), even in the case when the reading device 3 is not accurately positioned on a code due to the manual scanning process, it is possible to prevent the reading process of the code from being intervened by interference from the peripheral image, and consequently to reproduce data positively. Moreover, since any image other than the interference image 3 can be freely placed in the vicinity of the code, any peripheral image having a non-interference attribute is incorporated so that the recording face can be effectively utilized.

(2) The data recording medium in accordance with the above-mentioned (1), characterized in that the non-interference area is designed so that only the non-interference image having an attribute causing no adverse effects on the code reading process is allowed to exist.

This invention corresponds to the first embodiment, and its structure is shown in FIG. 7.

In other words, in FIG. 7, only the non-interference image 14 is allowed to exist in the non-interference area 11 so that, even when the reading device 3 is not accurately positioned on a code due to the manual scanning process, the peripheral image will not give adverse effects in reading the code.

Therefore, with the above-mentioned arrangement (2), even in the case when the reading device 3 is not accurately positioned on a code due to the manual scanning process, it is possible to prevent the reading process of the code from being intervened by interference from the peripheral image, and consequently to reproduce data positively. Moreover, since the non-interference image 14 can be freely place in the vicinity of the code, any peripheral image having a non-interference attribute is incorporated so that the recording face can be effectively utilized.

(3) The data recording medium in accordance with the above-mentioned (1) or (2), characterized in that the non-interference area is placed based upon the attribute of the interference image located in the vicinity of the code.

This invention corresponds to the first embodiment, and its structure is shown in FIG. 8 and FIG. 9.

In other words, in FIG. 8 and FIG. 9, in the non-interference area "A" 11A, any interference image "A" 13A having an attribute causing adverse effects on the code reading process when included therein is not allowed to exist, and in the non-interference area "B" 11A, any interference image "B" 13B is not allowed to exist. In contrast, any non-interference image "C" 14C having an attribute causing no adverse effects on the code reading process is allowed to freely exist in the non-interference area "A" 11A and non-interference area "B" 11B.

Therefore, with the above-mentioned arrangement (3), it is possible to ensure a minimum non-interference area 11 required which would not give any adverse effect on the code reading process, based upon attributes of the interference image 13 such as the shape, color and density of the code, image, text, etc., and consequently to reproduce data positively, while utilizing the recording face effectively, without interruption with the reading process of the code caused by interference from the peripheral image.

(4) The data recording medium in accordance with the above-mentioned (3), characterized in that the size of the non-interference area that is placed when the interference image placed in the vicinity of the code is a code is set to be wider than the size of the non-interference area that is placed when the interference image placed in the vicinity of the code is an image other than the code.

This invention corresponds to the first embodiment, and its structure is shown in FIG. 11.

In other words, in FIG. 11, in the non-interference area 11, any non-reading-target code 1' is not allowed to exist so as not to read one portion of another code 1' during a scanning process for a reading target code 1.

Therefore, with the above-mentioned arrangement (4), it is possible to reproduce data positively without erroneously reading a non-reading-target code located in the vicinity of a reading target code in addition to the reading target code.

(5) The data recording medium in accordance with the above-mentioned (1) or (2), characterized in that the size of the non-interference areas placed on the respective sides of the code in the scanning direction of the code is set to be wider than the size of the non-interference areas placed on the respective sides of the code in the direction orthogonal to the scanning direction of the code.

This invention corresponds to the second embodiment, and its structure is shown in FIG. 12.

In other words, in FIG. 12, the non-interference areas 11 are set wider on the respective sides in the scanning direction.

Therefore, with the above-mentioned arrangement (5), even when the reading device 3 overruns on the code at the time of scanning start and/or end due to the manual scanning process, the reading process of the code is not intervened by interference from the peripheral image; thus, it is possible to positively reproduce the data.

(6) The data recording medium in accordance with the above-mentioned (1) or (2), characterized in that the non-interference area is positioned in accordance with the positioning performance of the reading device for reading the code and the specification of the code.

This invention corresponds to the third or fourth embodiment, and its structure is shown in FIG. 14 or FIG. 17 and FIG. 21. Here, the specifications of the code 1 refer to overall characteristics concerning the scanning performances of the code, such as the size, structure and the presence or absence of overlapping.

In other words, in FIG. 14, in accordance with the positioning performance of the reading device 3 and the specifications of the code (which permit the amount of deviation determined by the positioning performance without the need for overlapped recording), a judgment is made as to the degree of relative positional deviation of the reading device 3 with respect to the code, and the non-interference area 11 is set based upon this judgment.

Moreover, in FIG. 17 and FIG. 21, a judgment is made as to the degree of relative positional deviation of the reading device 3 with respect to the code in accordance with the positioning performance (winding performance) and the specifications of the code (the width, the presence or absence of overlapping), and the non-interference area 11 is set based upon this judgment.

Therefore, with the above-mentioned arrangement (6), based upon the amount of relative positional deviation of the reading device 3 with respect to the code, derived from the judgment as to the positioning performance of the reading device 3 and the specification of the code, it is possible to ensure a minimum non-interference area 11 required, and consequently to utilize the recording face more effectively.

(7) The data recording medium in accordance with the above-mentioned (6), characterized in that the positioning performance includes a positioning performance that is determined based upon the external shape and/or size of the reading device in the vicinity of the part of the code reading device which is to contact the recording medium to read the code.

This invention corresponds to the third embodiment, and its structure is shown in FIG. 14.

In other words, in FIG. 14, in accordance with the positioning performance of the reading device 3 and the specifications of the code (which permit the amount of deviation determined by the positioning performance without the need for overlapped recording), a judgment is made as to the degree of relative positional deviation of the reading device 3 with respect to the code, and the non-interference area 11 is set based upon this judgment.

Therefore, with the above-mentioned arrangement (7), in accordance with the positioning performance that is determined based upon the external shape and/or the size of the reading device 3, it is possible to ensure a minimum non-interference area 11 required, and consequently to utilize the recording face more effectively.

(8) The data recording medium in accordance with the above-mentioned (7), characterized in that, if there is any directivity in the positioning performance, a wider non-interference area is provided on the side having the lower positioning performance based upon the directivity.

This invention corresponds to the third embodiment, and its structure is shown in FIG. 14.

In other words, in FIG. 14, based upon the directivity in the positioning performance of the reading device 3, the non-interference area 11 is set to be wider on the side having the lower performance.

Therefore, in the above-mentioned arrangement (8), the non-interference area 11 is set to be wider on the side having the lower positioning performance, and also set to be narrower on the side having the wider positioning performance; therefore, as compared with a case in which uniformly wide non-interference areas 11 are set in conformity with the side having the lower performance, it is possible to ensure a minimum non-interference area 11 required, and consequently to utilize the recording face more effectively.

(9) The data recording medium in accordance with the above-mentioned (6), characterized in that the specifications of the code include the width of the code in the direction orthogonal to the scanning direction of the code.

This invention corresponds to the fourth embodiment, and its structure is shown in FIG. 17.

In other words, in FIG. 17, in accordance with the positioning performance (winding performance) of the reading device 3 and the specification (width) of the code, a judgment is made as to the degree of relative positional deviation of the reading device 3 with respect to the code, and the non-interference area 11 is set based upon this judgment.

Therefore, with the above-mentioned arrangement (9), based upon the width of the code, it is possible to ensure a minimum non-interference area 11 required, and consequently to utilize the recording face more effectively.

(10) The data recording medium in accordance with the above-mentioned (9), characterized in that, when data is recorded in an overlapped manner in the width direction of the code, the width of the code is defined as the entire width including the portions having the data recorded in the overlapped manner in the width direction.

This invention corresponds to the fourth embodiment, and its structure is shown in FIG. 21.

In other words, as illustrated in FIG. 21, when data is recorded in an overlapped manner in the width direction of the code, the non-interference area 11 is set so as to become narrower as the width of the code becomes wider due to the overlapping.

Therefore, with the above-mentioned structure (10), even in the case of a code whose winding performance is improved by recording data in an overlapped manner, based upon the width of the code including the overlapped portions, it is possible to ensure a minimum non-interference area 11 required, and consequently to utilize the recording face more effectively.

(11) A data recording method, which records data as a code that can be optically read by using a manual scanning process, comprising the steps of:

placing a non-interference area on the periphery of the code on the recording medium, the non-interference area being set so that any interference image having an attribute causing adverse effects on the code reading process is not allowed to exist therein; and recording the code having the non-interference area.

Figure 23:
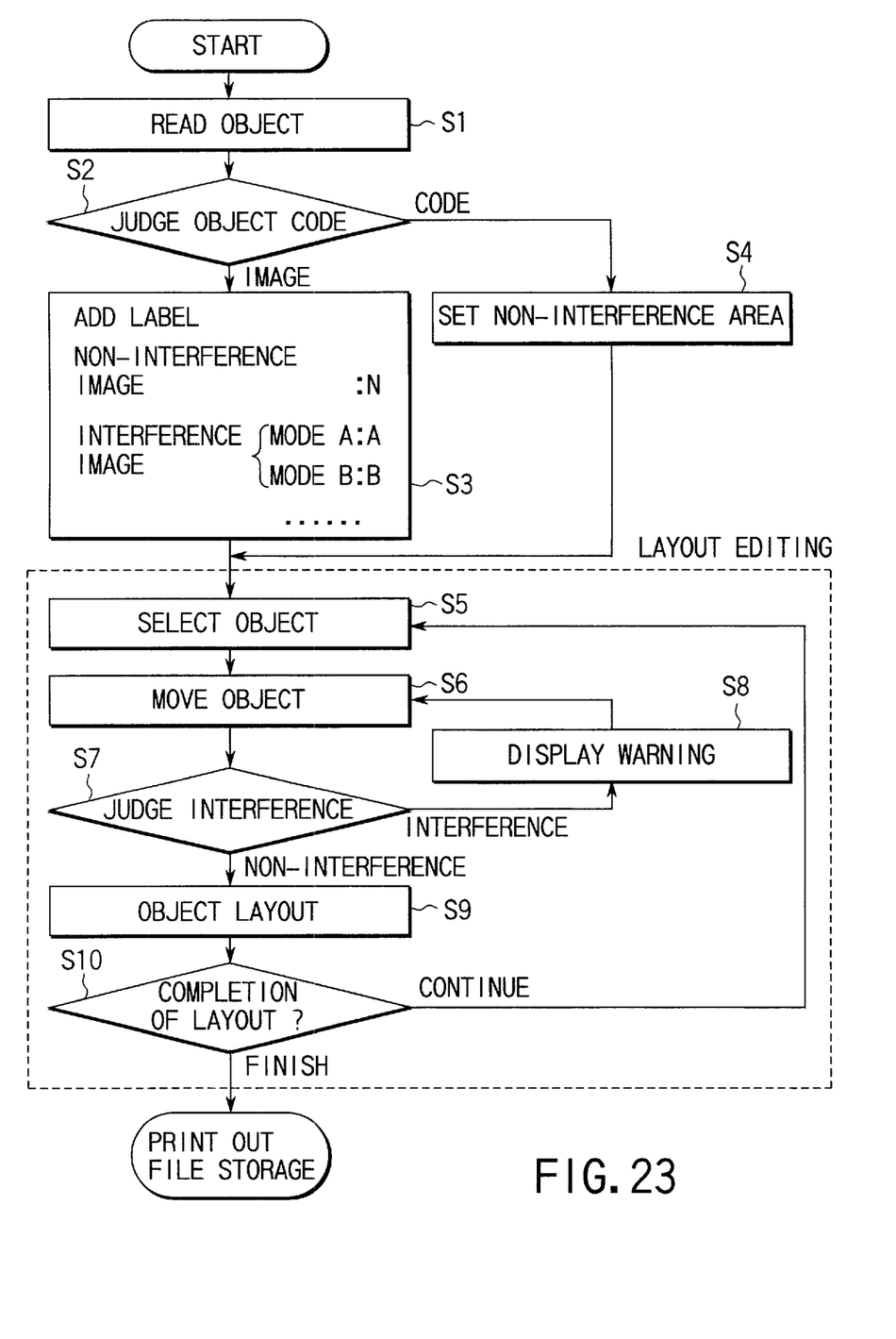
FIG. 23 is a flow chart that shows the operation of the data recording device of the fifth embodiment of the present invention.

This invention corresponds to the fifth embodiment, and its structure is shown in FIG. 23.

In other words, in FIG. 23, at step S4, the non-interference area 11 is placed on the periphery of the code so that, even when the reading device 3 is not accurately positioned on the code due to the manual scanning process, the peripheral image does not intervene with the reading process of the code. Moreover, at step S7, a judgment is made as to whether or not any interference occurs when an object is moved, and if any interference is anticipated, a warning is displayed at step S8, thereby inhibiting the object from being placed on the position.

Therefore, with the above-mentioned arrangement (11), even in the case when the reading device 3 is not accurately positioned on a code due to the manual scanning process, it is possible to prevent the reading process of the code from being intervened by interference from the peripheral image, and consequently to record data in a manner so as to be reproduced positively. Moreover, since any image other than the interference image 13 can be freely placed in the vicinity of the code, any peripheral image having a non-interference attribute is incorporated so that the recording face can be effectively utilized.

(12) The data recording method in accordance with the above-mentioned (11), characterized in that, in the step for placing the non-interference area, the non-interference image having an attribute causing no adverse effects on the code reading process is allowed to exist.

This invention corresponds to the fifth embodiment, and its structure is shown in FIG. 23.

In other words, in FIG. 23, at step S4, the non-interference area 11 is placed on the periphery of the code so that, even when the reading device 3 is not accurately positioned on the code due to the manual scanning process, the peripheral image does not intervene with the reading process of the code. Moreover, at step S7, a judgment is made as to whether or not any interference occurs when an object is moved, and if no interference is anticipated, the object is placed on the position at step S9.

Therefore, with the above-mentioned arrangement (12), even in the case when the reading device 3 is not accurately positioned on a code due to the manual scanning process, it is possible to prevent the reading process of the code from being intervened by interference from the peripheral image, and consequently to record data in a manner so as to be reproduced positively. Moreover, since the non-interference image 14 can be freely placed in the vicinity of the code, any peripheral image having a non-interference attribute is incorporated so that the recording face can be effectively utilized.

(13) The data recording method in accordance with the above-mentioned (11) or (12), characterized in that, in the step for placing the non-interference area, the non-interference area is placed based upon the attribute of the interference image located in the vicinity of the code.

This invention corresponds to the fifth embodiment, and its structure is shown in FIG. 23.

In other words, in FIG. 23, at step S2, based upon the attribute of an object, its interference mode is judged, and at step S3, in accordance with the result of the judgment, a label is added to the object for each interference mode. Moreover, at step S4, the corresponding non-interference area 11 is set for each interference mode. Then, at step S7, based upon the label of the object and the location of the non-interference area 11, a judgment is made as to whether or not any interference occurs when the object is moved, and if any interference is anticipated, a warning is displayed at S8, thereby inhibiting the object from being placed on the position. If no interference is anticipated, the object is placed on the position at S9.

Therefore, with the above-mentioned arrangement (13), it is possible to ensure a minimum non-interference area 11 required which would not give any adverse effect on the code reading process, based upon attributes of the interference image 13 such as the shape, color and density of the code, image, text, etc., and consequently to record data in a manner so as to be reproduced positively, while utilizing the recording face effectively, without interruption with the reading process of the code caused by interference from the peripheral image.

(14) The data recording method in accordance with the above-mentioned (13), characterized in that, in the step for placing the non-interference area, the size of the non-interference area that is placed when the interference image placed in the vicinity of the code is a code is set to be wider than the size of the non-interference area that is placed when the interference image placed in the vicinity of the code is an image other than the code.

This invention corresponds to the fifth embodiment, and its structure is shown in FIG. 23.

In other words, in FIG. 23, at step S4, the interference due to a non-reading-target code is discriminated from other interference modes due to other images, so that it becomes possible to prevent a portion of another code from being erroneously read during the scanning process of the reading target code.

Therefore, with the above-mentioned arrangement (14), it is possible to record data in a manner so as to be reproduced positively without erroneously reading a non-reading-target code located in the vicinity of a reading target code in addition to the reading target code.

(15) The data recording method in accordance with the above-mentioned (11) or (12), characterized in that, in the step for placing the non-interference area, the size of the non-interference areas placed on the respective sides of the code in the scanning direction of the code is set to be wider than the size of the non-interference areas placed on the respective sides of the code in the direction orthogonal to the scanning direction of the code.

This invention corresponds to the fifth embodiment, and its structure is shown in FIG. 23.

In other words, in FIG. 23, at step S4, the non-interference areas 11 are set wider on the respective sides in the scanning direction as compared with those on the respective sides in the direction orthogonal thereto.

Therefore, with the above-mentioned arrangement (15), even when the reading device 3 overruns on the code at the time of scanning start and/or end due to the manual scanning process, the reading process of the code is not intervened by interference from the peripheral image; thus, it is possible to record the data in a manner so as to be reproduced positively.

(16) The data recording method in accordance with the above-mentioned (11) or (12), characterized in that, in the step for placing the non-interference area, the non-interference area is positioned in accordance with the positioning performance of the reading device for reading the code and the specification of the code.

This invention corresponds to the fifth embodiment, and its structure is shown in FIG. 23.

In other words, in FIG. 23, at step 4, in accordance with the positioning performance of the reading device 3 and the specifications of the code, a judgment is made as to the degree of relative positional deviation of the reading device 3 with respect to the code, and the non-interference area 11 is set based upon this judgment.

Therefore, with the above-mentioned arrangement (16), based upon the amount of relative positional deviation of the reading device 3 with respect to the code, derived from the judgment as to the positioning performance of the reading device 3 and the specification of the code, it is possible to ensure a minimum non-interference area 11 required, and consequently to utilize the recording face more effectively.

(17) The data recording method in accordance with the above-mentioned (16), characterized in that the positioning performance includes a positioning performance that is determined based upon the external shape and/or size of the reading device in the vicinity of the part of the code reading device which is to contact the recording medium to read the code.

This invention corresponds to the fifth embodiment, and its structure is shown in FIG. 23.

In other words, in FIG. 23, in step S4, the positioning performance of the reading device 3 is found based upon its external shape and size, and based upon this, a judgment is made as to the degree of relative positional deviation of the reading device 3 with respect to the code, and the non-interference area 11 is set based upon this judgment.

Therefore, with the above-mentioned arrangement (17), in accordance with the positioning performance that is determined based upon the external shape and/or the size of the reading device 3, it is possible to ensure a minimum non-interference area 11 required, and consequently to utilize the recording face more effectively.

(18) The data recording method in accordance with the above-mentioned (17), characterized in that, in the step for placing the non-interference area, if there is any directivity in the positioning performance, a wider non-interference area is provided on the side having the lower positioning performance based upon the directivity.

This invention corresponds to the fifth embodiment, and its structure is shown in FIG. 23.

In other words, in FIG. 23, in the step S4, based upon the directivity in the positioning performance of the reading device 3, the non-interference area 11 is set to be wider on the side having the lower performance.

Therefore, in the above-mentioned arrangement (18), the non-interference area 11 is set to be wider on the side having the lower positioning performance, and also set to be narrower on the side having the wider positioning performance; therefore, as compared with a case in which uniformly wide non-interference areas 11 are set in conformity with the side having the lower performance, it is possible to ensure a minimum non-interference area 11 required, and consequently to utilize the recording face more effectively.

(19) The data recording method in accordance with the above-mentioned (16), characterized in that the specifications of the code include the width of the code in the direction orthogonal to the scanning direction of the code.

This invention corresponds to the fifth embodiment, and its structure is shown in FIG. 23.

In other words, in FIG. 23, in step S4, in accordance with the positioning performance (winding performance) of the reading device 3 and the specification (width) of the code, a judgment is made as to the degree of relative positional deviation of the reading device 3 with respect to the code, and the non-interference area 11 is set based upon this judgment.

Therefore, with the above-mentioned arrangement (19), based upon the width of the code, it is possible to ensure a minimum non-interference area 11 required, and consequently to utilize the recording face more effectively.

(20) The data recording method in accordance with the above-mentioned (19), characterized in that, when data is recorded in an overlapped manner in the width direction of the code, the width of the code is defined as the entire width including the portions having the data recorded in the overlapped manner in the width direction.

This invention corresponds to the fifth embodiment, and its structure is shown in FIG. 23.

In other words, in FIG. 23, at the step S4, when data is recorded in an overlapped manner in the width direction of the code, the non-interference area 11 is set so as to become narrower as the width of the code becomes wider due to the overlapping.

Therefore, with the above-mentioned structure (20), even in the case of a code whose winding performance is improved by recording data in an overlapped manner, based upon the width of the code including the overlapped portions, it is possible to ensure a minimum non-interference area 11 required, and consequently to utilize the recording face more effectively.

(21) A computer-readable memory medium comprising a program containing instructions which, upon recording data as a code that can be optically read by using a manual scanning process, executes the steps of:

placing a non-interference area on the periphery of the code on the recording medium, the non-interference area being set so that any interference image having an attribute causing adverse effects on the code reading process is not allowed to exist therein; and outputting the code including the non-interference area.

This invention corresponds to the fifth embodiment, and the program construction thus installed includes processes shown in FIG. 23.

In other words, in FIG. 23, at the step S4, the non-interference area is placed, and at the step S9, an object is placed so that no interference image is allowed to exist in this area. After the completion of the layout, this is outputted to a recording device such as a printer and a printing machine, or to a memory device such as an FD, a HD, an MO and a semiconductor memory.

Therefore, with the arrangement of the above-mentioned (21), by utilizing a computer, it becomes possible to easily form a recording medium from which data is positively reproduced without being interrupted by interference from an image located on the periphery of the reading target code, even when the code reading device is not accurately position on a code due to the manual scanning process. Moreover, since any image other than the interference images can be freely placed in the vicinity of the code, it is possible to effectively utilize the recording face by incorporating pictures and images thereto.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data recording medium comprising:
   an area in which data is recorded as a code that can be optically read by a manual scanning process; and
   a non-interference area placed on a periphery of the code, said non-interference area being an area in which an interference image to be placed in a vicinity of the code and having an attribute causing adverse effects in reading the code is not allowed to exist;
   wherein an extent of said non-interference area is set for each of a plurality of interference modes determined according to the attribute of the interference image; and
   wherein when the interference image to be placed in the vicinity of the code is an optically readable code, the size of said non-interference area is set to be wider than when the interference image to be placed in the vicinity of the code is an image other than the optically readable code.

2. The data recording medium according to claim 1, wherein said non-interference area includes areas on respective sides of the code in a scanning direction of the code and areas on respective sides of the code in a direction orthogonal to the scanning direction of the code, and wherein a size of said areas on the respective sides of the code in the scanning direction of the code is set to be wider than a size of said areas on the respective sides of the code in the direction orthogonal to the scanning direction of the code.

3. The data recording medium according to claim 1, wherein said non-interference area is positioned in accordance with a positioning performance of a reading device for reading the code and a specification of the code.

4. The data recording medium according to claim 3, wherein the specification of the code includes a width of the code in the direction orthogonal to the scanning direction of the code.

5. The data recording medium according to claim 4, wherein when data is recorded in an overlapped manner in a width direction of the code, the width of the code is defined as an entire width including portions having the data recorded in the overlapped manner.

6. The data recording medium according to claim 1, wherein the attribute of the interference image includes at least one of a shape, color and density of the interference image.

7. A data recording medium comprising:
   an area in which data is recorded as a code that can be optically read by a manual scanning process; and
   a non-interference area placed on a periphery of the code, said non-interference area being an area in which an interference image to be placed in a vicinity of the code and having an attribute causing adverse effects in reading the code is not allowed to exist;
   wherein an extent of said non-interference area is set for each of a plurality of interference modes determined according to the attribute of the interference image;
   wherein said non-interference area is positioned in accordance with a positioning performance of a reading device for reading the code and a specification of the code; and
   wherein the positioning performance is determined based upon at least one of an external shape and size of the reading device in a vicinity of a part of the reading device which is to contact the recording medium to read the code.

8. The data recording medium according to claim 7, wherein, if there is any directivity in the positioning performance, the non-interference area is formed to be wider on a side having a lower positioning performance.

9. A data recording method for recording data as a code that can be optically read by a manual scanning process, the method comprising:
   setting a non-interference area on a periphery of the code in which an interference image to be placed in a vicinity of the code and having an attribute causing adverse effects in reading the code is not allowed to exist; and
   recording the code and the non-interference area on a recording medium;
   wherein an extent of said non-interference area is set for each of a plurality of interference modes determined according to the attribute of the interference image; and
   wherein when the interference image to be placed in the vicinity of the code is an optically readable code, the size of said non-interference area is set to be wider than when the interference image to be placed in the vicinity of the code is an image other than the optically readable code.

10. The data recording method according to claim 9, wherein said non-interference area includes areas on respective sides of the code in a scanning direction of the code and areas on respective sides of the code in a direction orthogonal to the scanning direction of the code, and wherein a size of the areas on the respective sides of the code in the scanning direction of the code is set to be wider than a size of the non-interference areas on the respective sides of the code in the direction orthogonal to the scanning direction of the code.

11. The data recording method according to claim 9, wherein the non-interference area is positioned in accordance with a positioning performance of a reading device for reading the code and a specification of the code.

12. The data recording method according to claim 11, wherein the specification of the code includes a width of the code in the direction orthogonal to the scanning direction of the code.

13. The data recording method according to claim 12, wherein when data is recorded in an overlapped manner in a width direction of the code, the width of the code is defined as an entire width including portions having the data recorded in the overlapped manner.

14. The data recording method according to claim 9, wherein the attribute of the interference image includes at least one of a shape, color and density of the interference image.

15. A data recording method for recording data as a code that can be optically read by a manual scanning process, the method comprising:

setting a non-interference area on a periphery of the code in which an interference image to be placed in a vicinity of the code and having an attribute causing adverse effects in reading the code is not allowed to exist; and     recording the code and the non-interference area on a recording medium;

wherein an extent of said non-interference area is set for each of a plurality of interference modes determined according to the attribute of the interference image;

wherein the non-interference area is positioned in accordance with a positioning performance of a reading device for reading the code and a specification of the code; and     wherein the positioning performance is determined based upon at least one of an external shape and size of the reading device in a vicinity of a part of the reading device which is to contact the recording medium to read the code.

16. The data recording method according to claim 15, wherein if there is any directivity in the positioning performance, the non-interference area is formed to be wider on a side having a lower positioning performance.

17. A data recording medium comprising:

an area in which data is recorded as a code that can be optically read by a manual scanning process; and     a non-interference area placed on a periphery of the code, said non-interference area being an area in which an interference image to be placed in a vicinity of the code and having an attribute causing adverse effects in reading the code is not allowed to exist;

wherein an extent of said non-interference area is set for each of a plurality of interference modes determined according to the attribute of the interference image; and     wherein when a plurality of interference images having different attributes are to be placed in the vicinity of the code, a plurality of non-interference areas different from each other for each of the interference modes determined according to each of the attributes of the plurality of interference images are provided in the vicinity of the code, and each of the non-interference areas comprise an area whose extent is set according to a corresponding interference mode.

18. A data recording method for recording data as a code that can be optically read by a manual scanning process, the method comprising:

setting a non-interference area on a periphery of the code in which an interference image to be placed in a vicinity of the code and having an attribute causing adverse effects in reading the code is not allowed to exist; and     recording the code and the non-interference area on a recording medium;

wherein an extent of said non-interference area is set for each of a plurality of interference modes determined according to the attribute of the interference image; and     wherein when a plurality of interference images having different attributes are to be placed in the vicinity of the code, a plurality of non-interference areas different from each other for each of the interference modes determined according to each of the attributes of the plurality of interference images are provided in the vicinity of the code, and each of the non-interference areas comprise an area whose extent is set according to a corresponding interference mode.

\* \* \* \* \*